US011497028B2

(12) United States Patent
Zheng et al.

(10) Patent No.: US 11,497,028 B2
(45) Date of Patent: Nov. 8, 2022

(54) INTERFERENCE MITIGATION THROUGH SINR-BASED ITERATIVE DISTRIBUTED BEAM SELECTION

(71) Applicant: Meta Platforms Technologies, LLC, Menlo Park, CA (US)

(72) Inventors: Dong Zheng, Saratoga, CA (US); Qi Qu, Redmond, WA (US); Yuting Fan, Redmond, WA (US); Gang Lu, Pleasanton, CA (US); William Louis Abbott, Portola Valley, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/894,431

(22) Filed: Jun. 5, 2020

(65) Prior Publication Data
US 2021/0385817 A1 Dec. 9, 2021

(51) Int. Cl.
| H04W 72/08 | (2009.01) |
| G02B 27/01 | (2006.01) |
| H04B 7/06 | (2006.01) |
| H04W 72/04 | (2009.01) |

(52) U.S. Cl.
CPC ........ *H04W 72/082* (2013.01); *G02B 27/017* (2013.01); *H04B 7/0617* (2013.01); *H04B 7/0695* (2013.01); *H04W 72/046* (2013.01)

(58) Field of Classification Search
CPC .... H04W 72/042; H04L 5/0053; H04L 76/27; H04L 1/1812; H04L 5/0055
USPC ....................................................... 370/329
See application file for complete search history.

(56) References Cited

U.S. PATENT DOCUMENTS

| 10,567,898 | B1* | 2/2020 | Asfaw ............... H04N 5/2253 |
| 2009/0191866 | A1* | 7/2009 | Flore .................... H04W 8/005 |
| | | | 455/434 |
| 2015/0139292 | A1* | 5/2015 | Shirani-Mehr ... H04M 1/72457 |
| | | | 375/227 |

(Continued)

FOREIGN PATENT DOCUMENTS

WO  WO-2015/013401 A1  1/2015

OTHER PUBLICATIONS

International Search Report and Written Opinion on PCT Appln. PCT/US2021/031459, dated Aug. 11, 2021; 14 pages.

*Primary Examiner* — Sam K Ahn
*Assistant Examiner* — Gina M McKie
(74) *Attorney, Agent, or Firm* — Foley & Lardner LLP

(57) ABSTRACT

Systems and methods for iterative distributed beam selection include a device including at least one of a first head wearable display (HWD), a second HWD, a first console or a second console. The device detects a predefined condition. The device performs a first distributed beam selection responsive to detecting the predefined condition. Performing the first distributed beam selection includes performing beamforming to provide a first plurality of beams for a first link between the first HWD and the first console, selecting a first beam of the first link with a highest signal-to-interference-plus-noise ratio (SINR) from the first plurality of beams, performing beamforming to provide a second plurality of beams for a second link between the second HWD and the second console while the first beam of the first link is active, and selecting a second beam of the second link with a highest SINR from the second plurality of beams.

18 Claims, 7 Drawing Sheets

(56) References Cited

U.S. PATENT DOCUMENTS

| | | |
|---|---|---|
| 2015/0244432 A1 | 8/2015 | Wang |
| 2015/0282122 A1* | 10/2015 | Kim .................... H04B 7/0408 370/329 |
| 2017/0078013 A1* | 3/2017 | Sanderovich ........ H04B 7/0469 |
| 2017/0367101 A1 | 12/2017 | Cheng et al. |
| 2018/0234137 A1 | 8/2018 | Qu et al. |

\* cited by examiner

INTERFERENCE MITIGATION THROUGH SINR-BASED ITERATIVE DISTRIBUTED BEAM SELECTION

FIELD OF DISCLOSURE

The present disclosure is generally related to communications for rendering artificial reality, including but not limited to systems and methods for improving wireless communications for artificial reality.

BACKGROUND

Artificial reality such as a virtual reality (VR), an augmented reality (AR), or a mixed reality (MR) provides an immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of the artificial reality (e.g., a VR space, an AR space, or a MR space).

Due to head movements and multiple HWDs/consoles being co-located, which is a typical scenario in artificial reality experiences, interference between links of the devices may occur.

SUMMARY

In one respect, this disclosure is directed to a method. The method may include detecting, by a device including at least one of a first head wearable display (HWD), a second HWD, a first console, or a second console, a predefined condition. The method may include performing, by the device, a first distributed beam selection responsive to detecting the predefined condition. Performing the first distributed beam selection may include performing beamforming to provide a first plurality of beams for a first link between the first HWD and the first console. Performing the first distributed beam selection may include selecting a first beam of the first link with a highest signal-to-interference-plus-noise ratio (SINR) from the first plurality of beams. Performing the first distributed beam selection may include performing beamforming to provide a second plurality of beams for a second link between the second HWD and the second console while the first beam of the first link is active. Performing the first distributed beam selection may include selecting a second beam of the second link with a highest SINR from the second plurality of beams.

In some embodiments, the method includes performing, by the device, a second distributed beam selection. Performing the second distributed beam selection may include performing beamforming to provide a third plurality of beams for the first link while the second beam of the second link is active. Performing the second distributed beam selection may include selecting a third beam of the first link with a highest SINR from the third plurality of beams. Performing the second distributed beam selection may include performing beamforming to provide a fourth plurality of beams for the second link while the third beam of the first link is active. Performing the second distributed beam selection may include selecting a fourth beam of the second link with a highest SINR from the fourth plurality of beams. In some embodiments, the method further includes performing, by the device, communication via the third beam of the first link or the fourth beam of the second link.

In some embodiments, the method further includes determining, by the device, for a first time window, a first average SINR corresponding to at least one of the first link or the second link. The method may further include determining, by the device, for a second time window, a second average SINR corresponding to the at least one of the first link or the second link. The method may further include detecting, by the device, the predefined condition, the predefined condition including the second average SINR being less than the first average SINR. In some embodiments, the first average SINR includes a first exponential average SINR and the second average SINR includes a second exponential average SINR.

In some embodiments, detecting the predefined condition includes detecting, by the device, an interfering link that interferes with at least one of the first link or the second link. In some embodiments, detecting the link includes detecting, by the device, one or more signals from the interfering link while at least one of the first link or the second link is active. In some embodiments, detecting the predefined condition includes detecting, by the device, removal of an interfering link that has previously interfered with at least one of the first link or the second link. In some embodiments, detecting removal of the interfering link includes detecting, by the device, that the interfering link has been absent for at least a predetermined amount of time. In some embodiments, detecting the predefined condition includes determining, by the device, expiration of an amount of time from a prior beamforming or distributed beam selection.

In another respect, this disclosure is directed to a device including at least one of a first head wearable display (HWD), a second HWD, a first console, or a second console. The device may include at least one processor configured to detect a predefined condition. The at least one processor may be configured to perform a first distributed beam selection responsive to detecting the predefined condition. Performing the first distributed beam selection may include performing beamforming to provide a first plurality of beams for a first link between the first HWD and the first console. Performing the first distributed beam selection may include selecting a first beam of the first link with a highest signal-to-interference-plus-noise ratio (SINR) from the first plurality of beams. Performing the first distributed beam selection may include performing beamforming to provide a second plurality of beams for a second link between the second HWD and the second console while the first beam of the first link is active. Performing the first distributed beam selection may include selecting a second beam of the second link with a highest SINR from the second plurality of beams.

In some embodiments, the at least one processor is further configured to perform a second distributed beam selection. Performing the second distributed beam selection may include performing beamforming to provide a third plurality of beams for the first link while the second beam of the second link is active. Performing the second distributed beam selection may include selecting a third beam of the first link with a highest SINR from the third plurality of beams. Performing the second distributed beam selection may include performing beamforming to provide a fourth plurality of beams for the second link while the third beam of the first link is active. Performing the second distributed beam selection may include selecting a fourth beam of the second link with a highest SINR from the fourth plurality of beams. In some embodiments, the at least one processor is further configured to perform downlink communication via the third beam of the first link or the fourth beam of the second link.

In some embodiments, the at least one processor is further configured to determine, for a first time window, a first average SINR corresponding to at least one of the first link or the second link. The at least one processor may further be configured to determine, for a second time window, a second average SINR corresponding to the at least one of the first link or the second link. The at least one processor may further be configured to detect the predefined condition, the predefined condition including the second average SINR being less than the first average SINR. In some embodiments, the at least one processor is configured to detect the predefined condition by detecting an interfering link that interferes with at least one of the first link and the second link. In some embodiments, the at least one processor is configured to detect the predefined condition by detecting removal of an interfering link that has previously interfered with at least one of the first link or the second link. In some embodiments, the at least one processor is configured to detect removal of the interfering link by detecting that the interfering link has been absent for at least a predetermined amount of time. In some embodiments, the at least one processor is configured to detect the predefined condition by detecting expiration of an amount of time from a prior beamforming or distributed beam selection.

In still another respect, this disclosure is directed to a non-transitory computer readable medium storing program instructions for causing one or more processors to detect, in a device including at least one of a first head wearable display (HWD), a second HWD, a first console, or a second console, a predefined condition. The program instructions may further cause the one or more processors to perform a first distributed beam selection responsive to detecting the predefined condition. Performing the first distributed beam selection may include performing beamforming to provide a first plurality of beams for a first link between the first HWD and the first console. Performing the first distributed beam selection may include selecting a first beam of the first link with a highest signal-to-interference-plus-noise ratio (SINR) from the first plurality of beams. Performing the first distributed beam selection may include performing beamforming to provide a second plurality of beams for a second link between the second HWD and the second console while the first beam of the first link is active. Performing the first distributed beam selection may include selecting a second beam of the second link with a highest SINR from the second plurality of beams.

In some embodiments, the program instructions further cause the one or more processors to perform a second distributed beam selection. Performing the second distributed beam selection may include performing beamforming to provide a third plurality of beams for the first link while the second beam of the second link is active. Performing the second distributed beam selection may include selecting a third beam of the first link with a highest SINR from the third plurality of beams. Performing the second distributed beam selection may include performing beamforming to provide a fourth plurality of beams for the second link while the third beam of the first link is active. Performing the second distributed beam selection may include selecting a fourth beam of the second link with a highest SINR from the fourth plurality of beams.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments below, the following descriptions of the sections of the specification and their respective contents may be helpful:

Section A discloses an artificial reality system which may be useful for practicing embodiments described herein;

Section B discloses systems and methods for SINR-based iterative distributed beam selection; and Section C discloses a computing system which may be usable to implement aspects of the present disclosure.

A. Artificial Reality System

Figure 1:
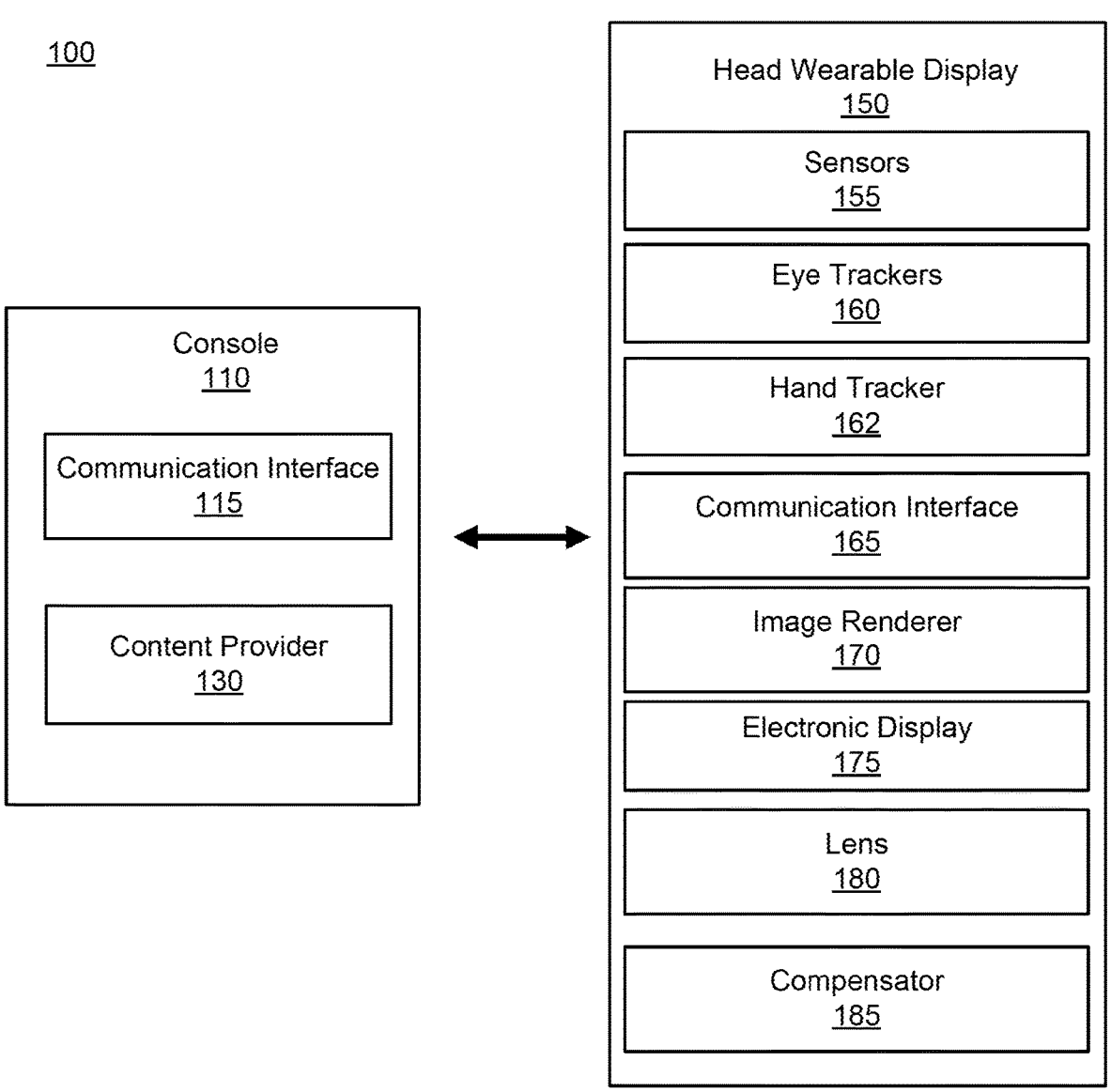
FIG. 1 is a diagram of a system environment including an artificial reality system, according to an example implementation of the present disclosure.

Disclosed herein are systems and methods for facilitating distribution of artificial reality (e.g., augmented reality (AR), virtual reality (VR), or mixed reality (MR)) content. FIG. 1 is a block diagram of an example artificial reality system environment 100. In some embodiments, the artificial reality system environment 100 includes a head wearable display (HWD) 150 worn by a user, and a console 110 providing content of artificial reality to the HWD 150. The HWD 150 may detect its location and/or orientation of the HWD 150, and provide the detected location/or orientation of the HWD 150 to the console 110. The console 110 may generate image data indicating an image of the artificial reality according to the detected location and/or orientation of the HWD 150 as well as a user input for the artificial reality, and transmit the image data to the HWD 150 for presentation.

In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some embodiments, the console 110 is integrated as part of the HWD 150.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a hand tracker 162, a communication interface 165, an image renderer 170, an electronic display 175, a lens 180, and a compensator 185. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detect a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming, for an example, that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming, for another example, that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the HWD 150, the console 110, or a combination of them, may incorporate the gaze direction of the user of the HWD 150 to generate image data for artificial reality. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation, and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gaze direction of the user. Assuming, for an example, that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the hand tracker 162 includes an electronic component or a combination of an electronic component and a software component that tracks a hand of the user. In some embodiments, the hand tracker 162 includes or is coupled to an imaging sensor (e.g., camera) and an image processor that can detect a shape, a location and an orientation of the hand. The hand tracker 162 may generate hand tracking measurements indicating the detected shape, location, and orientation of the hand.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link. Examples of the wireless link can include a cellular communication link, a near field communication link, Wi-Fi, Bluetooth, 60 GHz wireless link, or any communication wireless communication link. Through the communication link, the communication interface 165 may transmit to the console 110 data indicating the determined location, and/or orientation of the HWD 150, the determined gaze direction of the user, and/or hand tracking measurement. Moreover, through the communication link, the communication interface 165 may receive from the console 110 image data indicating or corresponding to an image to be rendered and additional data associated with the image.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, image data describing an image of artificial reality to be rendered and additional data associated with the image, and render the image through the electronic display 175. In some embodiments, the image data from the console 110 may be encoded, and the image renderer 170 may decode the image data to render the image. In some embodiments, the image renderer 170 receives, from the console 110 in additional data, object information indicating virtual objects in the artificial reality space, and depth information indicating depth (or distances from the HWD 150) of the virtual objects. In one aspect, according to the image of the artificial reality, object information, depth information from the console 110, and/or updated sensor measurements from the sensors 155, the image renderer 170 may perform shading, reprojection, and/or blending to update the image of the artificial reality to correspond to the updated location and/or orientation of the HWD 150. Assuming that a user rotated his head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality. In some embodiments, the image renderer 170 receives hand model data indicating a shape, a location, and an orientation of a hand model corresponding to the hand of the user, and overlay the hand model on the image of the artificial reality. Such hand model may be presented as a visual feedback to allow a user to provide various interactions within the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the pre-distorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location, and an orientation of the HWD 150 in a physical space into a virtual space (or simultaneous localization and mapping (SLAM) data), motion vector information, depth information, edge information, object information, etc. The console 110 may provide the image data and the additional data to the HWD 150 for presentation of the artificial reality. In other embodiments, the console 110 includes more, fewer, or different components than shown in FIG. 1. In some embodiments, the console 110 is integrated as part of the HWD 150.

In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., wireless link). Through the communication link, the communication interface 115 may receive from the HWD 150 data indicating the determined location and/or orientation of the HWD 150, the determined gaze direction of the user, and the hand tracking measurement. Moreover, through the communication link, the communication interface 115 may transmit to the HWD 150 image data describing an image to be rendered and additional data associated with the image of the artificial reality.

The content provider 130 is a component that generates content to be rendered according to the location and/or orientation of the HWD 150. In some embodiments, the content provider 130 may incorporate the gaze direction of the user of the HWD 150, and a user interaction in the artificial reality based on hand tracking measurements to generate the content to be rendered. In one aspect, the content provider 130 determines a view of the artificial reality according to the location and/or orientation of the HWD 150. For example, the content provider 130 maps the location of the HWD 150 in a physical space to a location within an artificial reality space, and determines a view of the artificial reality space along a direction corresponding to the mapped orientation from the mapped location in the artificial reality space. The content provider 130 may generate image data describing an image of the determined view of the artificial reality space, and transmit the image data to the HWD 150 through the communication interface 115. The content provider 130 may also generate a hand model corresponding to a hand of a user of the HWD 150 according to the hand tracking measurement, and generate hand model data indicating a shape, a location, and an orientation of the hand model in the artificial reality space. In some embodiments, the content provider 130 may generate additional data including motion vector information, depth information, edge information, object information, hand model data, etc., associated with the image, and transmit the additional data together with the image data to the HWD 150 through the communication interface 115. The content provider 130 may encode the image data describing the image, and can transmit the encoded data to the HWD 150. In some embodiments, the content provider 130 generates and provides the image data to the HWD 150 periodically (e.g., every 11 ms).

Figure 2:
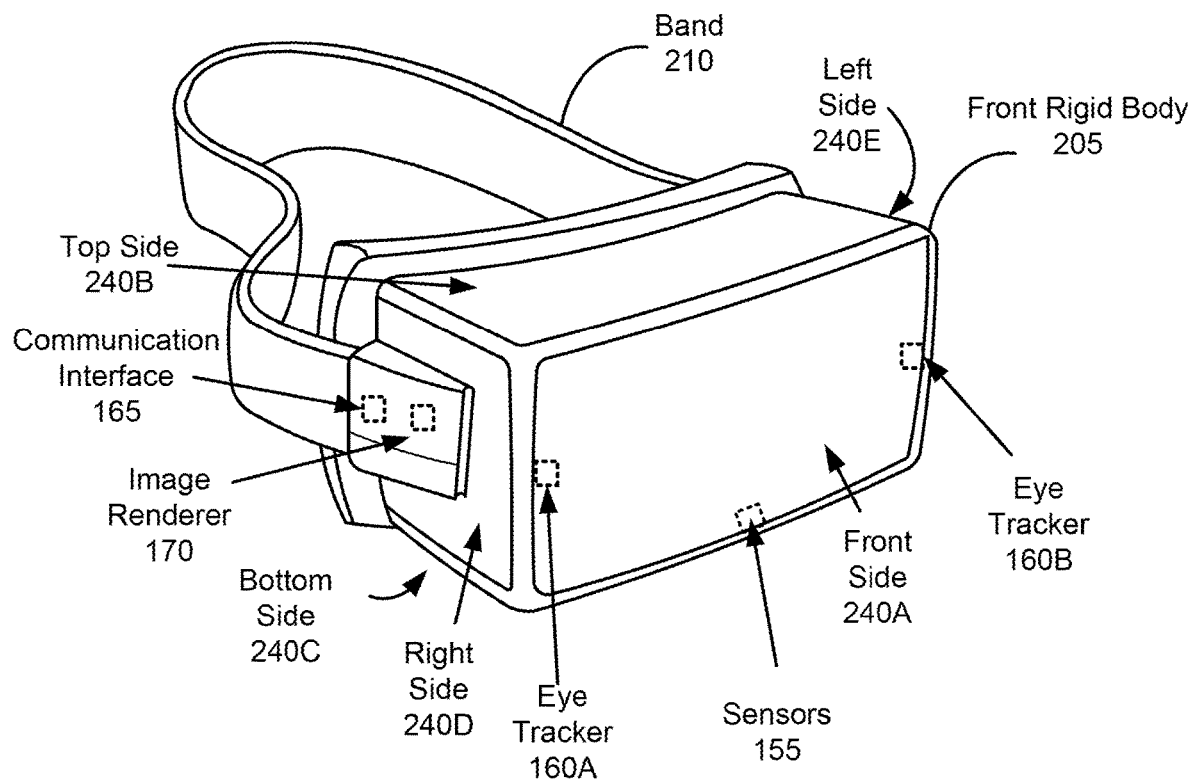
FIG. 2 is a diagram of a head mounted display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the embodiment shown by FIG. 2, the communication interface 165, the image renderer 170, and the sensors 155 are located within the front rigid body 205, and may not visible to the user. In other embodiments, the HWD 150 has a different configuration than shown in FIG. 2. For example, the communication interface 165, the image renderer 170, the eye trackers 160A, 160B, and/or the sensors 155 may be in different locations than shown in FIG. 2. In some embodiments, the HWD 150 may include a plurality of communications interfaces 165. Similarly, the console 110 of FIG. 1 may include a plurality of communications interfaces 115. As described in greater detail below in section B, the communications interface(s) 115, 165 may be configured to selectively perform beamforming to optimize the communications channel between the console 110 and HWD 150. Similarly, the console 110 and HWD 150 may dynamically and intelligently switch between active and idle communications interface(s) 115, 165 to optimize the communications channel between the console 110 and HWD 150.

B. Systems and Methods for SINR-Based Iterative Distributed Beam Selection

Systems and methods for SINR-based beam selection are described herein. The systems and methods described herein may be implemented in a device which includes at least one component, element, or aspect of the artificial reality system described in section A. For instance, the systems and methods described herein may be implemented within or across the console 110, the HWD 150, etc. Where two users of an artificial reality system are co-located in a space, interference may occur between their respective devices and links. As interference occurs, overall user experience may be degraded. This disclosure addresses interference by implementing an algorithm or process which triggers distributed and iterative beamforming and beam selection. The systems and methods described herein can result in less complexity for beam selection and beamforming thereby resulting in lower power consumption in comparison to other methods of beamforming optimization, while still delivering beneficial results by reducing interference from other interfering links and/or improving overall link performance between the respective devices.

The present disclosure includes embodiments of a system and a method for performing a distributed beam selection responsive to detecting a predefined condition. A device may perform the first distributed beam selection (e.g., joint selection of beam alignment for multiple links) by performing beamforming to provide a first plurality of beams for a first link between the HWD and the console. The device may select a first beam of the first link with a highest signal-to-interference-plus-noise ratio (SINR) from the first plurality of beams. The device may perform beamforming to provide a second plurality of beams for a second link between the HWD and the console while the first beam of the first link is active (e.g., communicating packets). The device may select a second beam of the second link with a highest SINR from the second plurality of beams.

In some respects, because interference can occur as users co-located in a space move about the space, the systems and methods described herein may selectively perform an iterative, distributed beam selection algorithm to optimize the links (e.g., both the uplink and downlink links) between the HWD and console for each of the users. The systems and methods described herein may perform the beam selection algorithm based on a comparison of a current signal-to-interference-plus-noise ratio (SINR) to a previous SINR. For example, the systems and methods described herein may monitor and estimate a SINR of the link between radio frequency integrated circuits (RFICs) of the glasses (HWD) and the computing device (console). The systems and methods described herein may compute or estimate an exponential average SINR, and compare this estimated SINR to a previous SINR estimation. The system may automatically trigger beamforming or beam selection based on the comparison. Additionally, the system may automatically trigger beamforming and/or beam selection when the system detects interfering links. The system may detect interfering links through their respective signals or transmissions, or link drop off (e.g., an existing link has not been heard/detected for a certain amount of time). The system may use an aging algorithm to purge the interfering link list. The system may automatically trigger beamforming according to a timer (e.g., automatically trigger beamforming after a predetermined time interval). Hence, the system may automatically trigger beamforming and/or beam selection if any of the previous conditions are met.

To perform beam selection, the systems and methods described herein may perform a distributed beam selection to maximize the SINR on both links, e.g., to determine the starting conditions. The systems and methods may perform two or more iterations of SINR beam selection where the links converge on optimized beams for both links. The device may select beams for a first link by performing beamforming and maximizing the SINR of the first link. The device may select beams for a second link by performing beamforming and maximizing the SINR of the second link while the beams of the first link are active/present (e.g., without regard to the SINR of the first link). The device may then re-perform the selection of beams for the first link without regard to the SINR of the second link and while the beams of the second link are present/active. The device may re-perform selection of beams for the second link without regard to the SINR of the first link and while the selected beams for the first link are present. Following the final iteration of the beam selection, the selected beams may converge to optimize the SINR of both links.

According to such implementations and embodiments, the systems and methods described herein may automatically trigger beamforming and dynamic beam selection based on any number of specified, predetermined, or predefined conditions. Such implementations and embodiments may provide for better user experiences through mitigation or reduction of interference between links. Additionally, the systems and methods described herein may maximize the SINR ratio of both links to ensure that all users have a satisfying user experience. Such implementations are not computationally expensive, while still reducing interference and improving overall link performance. The systems and methods described herein may provide a distributed approach of SINR maximization, thereby eliminating the need for coordination between devices and any need for a centralized infrastructure. Such a distributed approach of SINR maximization may reduce overall computing and hardware costs.

Figure 3:
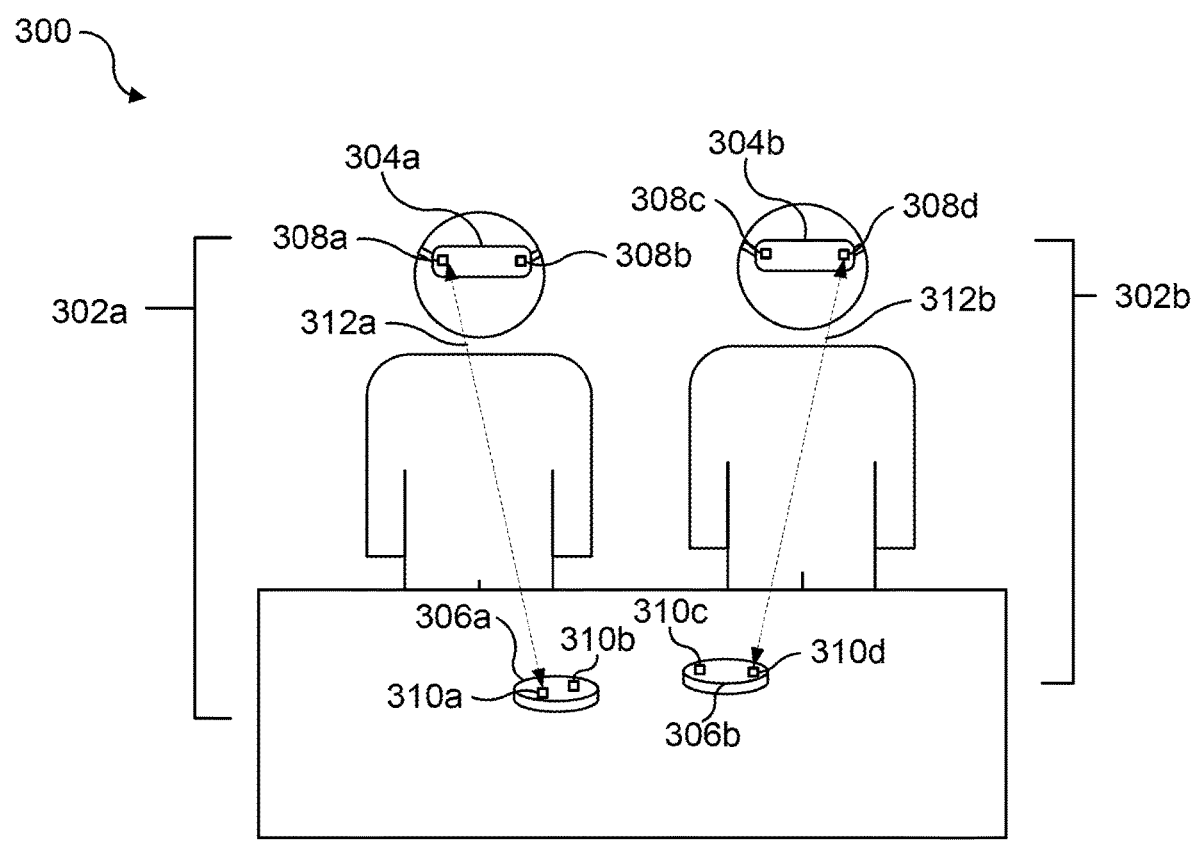
FIG. 3 and FIG. 4 are examples of environments in which beam selection may be performed for the system environment of FIG. 1, according to example implementations of the present disclosure.
Figure 4:
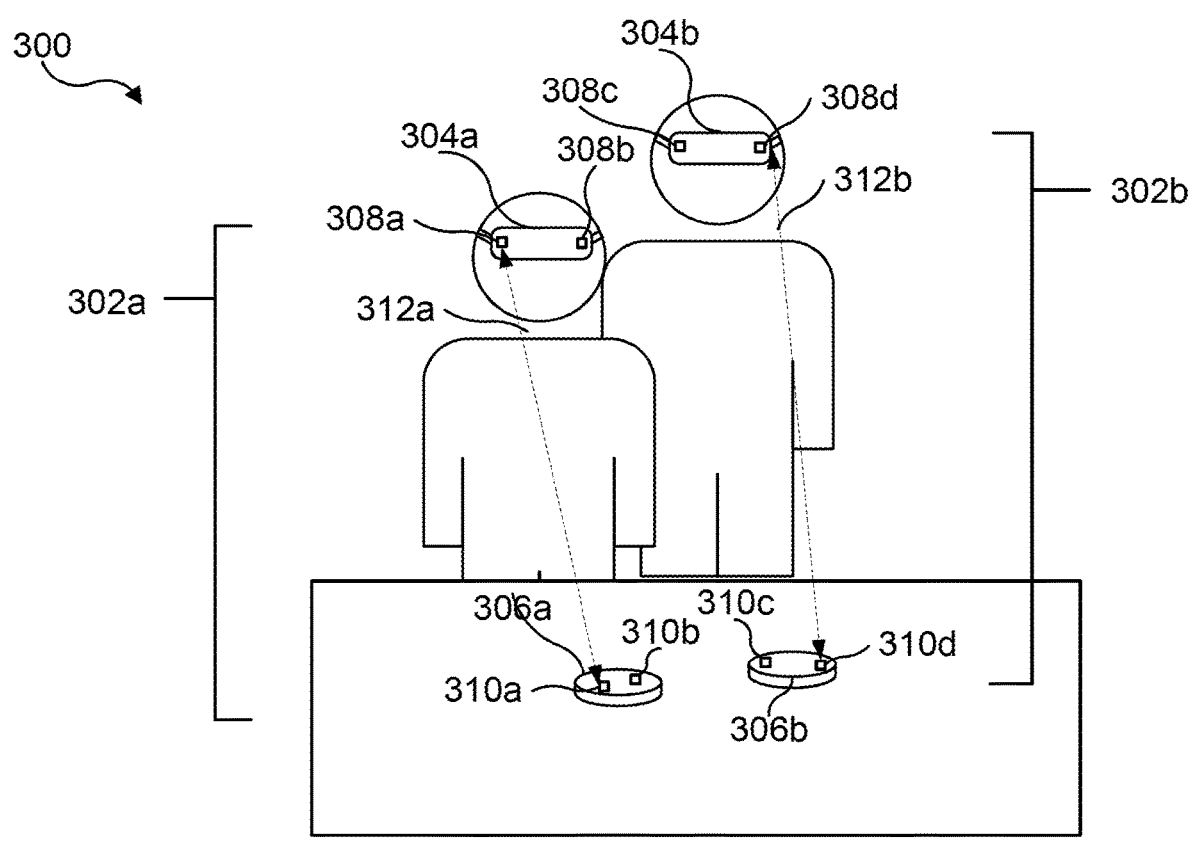

Referring now to FIG. 3 and FIG. 4, depicted are two example environments 300 in which a device 302 may perform beam selection, according to an illustrative embodiment. As shown in FIG. 3 and FIG. 4, in some implementations, multiple users of respective devices 302 (also referred to as device 302a, 302b) may be co-located in a common space or environment 300. In some embodiments, the device 302 may include a head wearable display (HWD) 304 (also referred to as HWD 304a, 304b) and/or a console 306 (also referred to as console 306a, 306b). The HWD 304 may include one or more radio-frequency integrated circuits (RFICs) 308a-308d (also referred to as "HWD RFIC"). Similarly, the console 306 may include one or more RFICs 310a-310d (also referred to as "console RFIC"). Each of the devices 302 may include a corresponding link 312. The link 312 may include a downlink (e.g., a link from the console 306 to the HWD 304) and an uplink (e.g., a link from the HWD 304 to the console 306). The device 302 may use the link 312 for exchanging communications between the HWD 304 and console 306. As described in greater detail below, where the users corresponding to the respective devices 302 move about the space 300, the links 312 may interfere with one another. Such interference may cause disruptions and decrease/degrade user experience. The device 300 may be configured to detect a condition for performing beam selection. The device 300 may be configured to perform beam selection responsive to detecting the condition. The device 300 may perform beam selection by performing beamforming to provide a plurality of beams for a first link 312 between the HWD 304 and console 306 (e.g., the uplink or the downlink). The device 300 may select a beam for the first link 312 with a highest signal-to-interference-plus-noise ratio (SINR) from the first plurality of beams. The device 300 may then perform beamforming to provide a second plurality of beams for a second link 312 (e.g., the downlink or the uplink) while the selected beam for the first link 312 is active. The device 300 may then select a second beam for the second link 312 with the highest SINR from the second plurality of beams.

The HWD 304 may be similar in some aspects to the HWD 150 shown in FIG. 1 and FIG. 2 and described in section A. Similarly, the console 306 may be similar in some aspects to the console 110 shown in FIG. 1 and described in section A. The HWD RFICs 308 may be a component or aspect of the communication interface 165, and the console RFICs 310 may be a component or aspect of the communication interface 115. An HWD RFIC 308 and a console RFIC 310 may be configured to communicate or exchange (or facilitate the exchange of) data wirelessly between the HWD 304 and console 306 via the links 312. The RFICs 308, 310 may be any device, component, or circuit designed or implemented to direct, send, or otherwise transmit data in a direction, e.g., between the HWD 304 and console 306, along or via the link 312. The device 302 may be configured to establish the link via the communication interfaces 115, 165. The RFIC 308 may be configured to transmit data via the uplink 312 to the RFIC 310 of the console 306, and the RFIC 310 may be configured to transmit data via the downlink 310 to the RFIC 306 of the HWD 304.

The device 302 may be configured to detect a number of predefined conditions for triggering distributed beam selection. In some embodiments, the device 302 may be configured to perform beam selection responsive to detecting a start-up condition. In some embodiments, the device 302 may be configured to perform beam selection based on a signal-to-interference-plus-noise ratio (SINR) of the link 312 (which may include a signal-to-noise ratio (SNR)). In some embodiments, the device 302 may be configured to perform beam selection responsive to detecting an interfering link 312b that interferes with the link 312a for the device 302a. In some embodiments, the device 302 may be configured to perform beam selection responsive to detecting a link drop-off. In some embodiments, the device 302 may be configured to perform beam selection responsive to an expiry interval (e.g., from a previous beam selection process or a previous beamforming). In these and other embodiments, the device 302 may be configured to perform beam selection responsive to detecting a predefined condition, as described in greater detail below.

In some embodiments, one of the predefined conditions may include detecting a start-up condition. In some embodiments, the device 302 may be configured to detect a start-up condition. The device 302 may be configured to detect a start-up condition based on an initialization signal (e.g., from the HWD 304, the console 306, etc.). The device 302 may be configured to detect the start-up condition based on a command (e.g., a hand-shake command) sent from the HWD 304 to the console 306 (or vice versa). The command may be a request to establish a connection (e.g., a link 312) between the HWD 304 and console 306. The device 302 may thus trigger beam selection responsive to a request to establish a link 312 between the HWD 304 and console 306, which may be received responsive to a user turning on, starting, or otherwise initializing the HWD 304 and/or console 306. The device 302 may be configured to perform beam selection as described in greater detail below, responsive to detecting the start-up condition.

In some embodiments, one of the predefined conditions may include a SINR for the link being less than an average SINR. In some embodiments, the device 302 may be configured to identify, detect, measure, compute, or otherwise determine a SINR for the link 312 (e.g., for uplink and/or downlink transmission). The device 302 may be configured to determine the SINR for the link 312 by comparing a main signal corresponding to data transmitted via the link 312, to noise signal(s) on the link 312. In some embodiments, the device 312 may be configured to compute the SINR by dividing the main signal value by the noise signal(s). The device 312 may be configured to maintain a list, ledger, or other set of data points (e.g., a dataset) corresponding to the SINR for the link 312. In some embodiments, each of the data points of the dataset may include a timestamp corresponding to when a SINR for the link 312 was computed. Accordingly, the dataset may be a time valued dataset. The device 312 may be configured to use the dataset for detecting a condition to trigger performance of beam selection.

In some embodiments, the device 302 may be configured to identify, compute, or otherwise determine an average of the SINR corresponding to the link 312 (e.g., corresponding to the uplink and/or the downlink transmission) from the dataset. The device 302 may be configured to determine the average of the SINR for a time window (e.g., a first time window). The time window may be a rolling time window (e.g., 10 most recent data points from the dataset (corresponding to 10 time instances within a time interval), 15 most recent data points from the dataset, 20 most recent data points from the dataset, 50 most recent data points from the dataset, and so forth). In some embodiments, the device 302 may be configured to compute the average SINR for the data points of the dataset having a timestamp within the time window. In some embodiments, the average may be an exponential average. The device 302 may be configured to compute an exponential average within the time window. In other words, the exponential average may be an exponential moving average. Hence, the device 302 may be configured to compute the exponential moving average to favor more recent data points of the SINR from the dataset.

The device 302 may be configured to determine a SINR or an average SINR for another time window (e.g., a second time window) or for a certain time instance. In some embodiments, the second time window may include a single data point. In some embodiments, the second time window may overlap the first time window. In some embodiments, the second time window may be subsequent to the first time window. In some embodiments, the second time window may partially overlap the first time window. The second time window may include data point(s) having a time stamp which is more recent than the data points corresponding to the first time window.

The device 302 may be configured to compare the SINR (or average SINR) of the second time window to the average SINR of the first time window. The device 302 may be configured to detect a condition which triggers beam selection based on the comparison. In some embodiments, the device 302 may be configured to compare the SINR of the second time window to the average SINR of the first time window and/or a predetermined threshold. The device 302 may be configured to perform beam selection responsive to the SINR for the second time window being less than the average SINR of the first time window (by an amount less than the predetermined threshold). Accordingly, where the SINR for the link is below an average SINR for a previous time window beyond a threshold amount, the device 302 may be configured to perform beam selection.

In some embodiments, one of the predefined conditions may include detecting an interfering link. In some embodiments, the device 302 may be configured to detect an interfering link 312. In some instances, the link 312b (e.g., uplink and/or downlink 312b) may interfere with the link 312a for the first device 302. Similarly, in some instances, the link 312a (e.g., uplink and/or downlink 312a) may interfere with the link 312b for the second device 302. As one example, in FIG. 4, as the second user corresponding to the second device 302b moves behind the first user corresponding to the first device 302a, the link 312b may interfere with the link 312a corresponding to the first device 302a.

The device 302a may be configured to detect an interfering link 312b that interferes with the link 312a (e.g., uplink and/or the downlink 312a). In some embodiments, packets exchanged via the link 312a may include identifying information which corresponds to a destination for the packet (e.g., identifying information for the HWD 304a in a downlink packet, and identifying information for the console 306a in an uplink packet). Similarly, packets exchanged via the link 312b may include identifying information (e.g., device identifier/address) which corresponds to a destination for the packet (e.g., identifying information for the HWD 304b in a downlink packet, and identifying information for the console 306b in an uplink packet). The device 302a may be configured to detect the interfering link 312b using the identifying information from a packet received by the HWD 304a or console 306a. The device 302a may be configured to detect the interfering link 312b responsive to the identifying information being inconsistent with identifying information corresponding to the HWD 304a, 306a. For example, the device 302a may be configured to identify an interfering link 312b where a packet received by the HWD 304a includes identifying information corresponding to the HWD 304b. Similarly, the device 302a may be configured to identify an interfering link 312b where a packet received by the console 306a includes identifying information corresponding to the console 306b.

In some embodiments, the device 302 may be configured to maintain a list, ledger, or other database of interfering links detected by the device 302. In some embodiments, the device 302 may be configured to include an identifier in the database corresponding to the interfering link (for example, the identifying information in the packet used to identify the interfering link). The device 302 may be configured to include a timestamp for each entry in the database. The device 302 may be configured to update the timestamp (or reset a timer) as an interfering link 312 is detected or identified again (e.g., at a subsequent point in time). In other words, the device 302 may be configured to update the database to reflect/track a most recent time (or proximity in time) for which a particular interfering link 312 is detected by the device 302.

In some embodiments, one of the predefined conditions may include detecting removal or absence of an interfering link. In some embodiments, the device 302 may be configured to detect a link drop-off (e.g., removal of a link 312). The device 302 may be configured to detect the link drop-off responsive to the device 302 not detecting an interfering link for a predetermined amount of time (e.g., 100 ms, 200 ms, 500 ms, 1 second, 2 seconds, 5 seconds, etc.). For example, the device 302 may be configured to delete, purge, or otherwise remove interfering links 312 from the database responsive to those interfering links 312 not being detected (or being absent) for the predetermined duration of time. The device 302 may be configured to compare the timestamp for the interfering links 312 in the database to the predetermined duration of time. The device 302 may be configured to purge the interfering link 312 from the database responsive to a difference between a current time and a most-recent timestamp of the interfering link exceeding the predetermined duration of time. In some embodiments, the device 302 may be configured to perform beam selection responsive to detecting a link drop-off (e.g., removal of an interfering link that has previously interfered with the link 312).

In some embodiments, one of the predefined conditions may include detecting expiration of an amount of time (e.g., 100 ms, 500 ms, 1 second, 5 seconds, etc.) from a previous or prior beam selection or a prior beamforming. In some embodiments, the device 302 may be configured to detect an expiration of an amount of time from a prior beam selection for instance. The device 302 may be configured to determine or identify a duration from the most recent beam selection for the link 312. The device 302 may be configured to compare the duration to a threshold. The device 302 may be configured to determine that the time from a prior beam selection (or a prior beamforming) has expired when the duration exceeds the threshold. The device 302 may be configured to trigger beam selection responsive to expiration of the amount of time from the prior beam selection or beamforming.

According to at least some of the embodiments described herein, the device 302 may be configured to trigger beam selection responsive to one or more of the predefined conditions described herein. In some embodiments, the device 302 may be configured to trigger beam selection responsive to additional predefined conditions. The device 302 may be configured to perform beam selection as described in greater detail below. In some embodiments, the device 302 may be configured to perform beam selection for both sides of the link (e.g., for the uplink and for the downlink for the link 312). In some embodiments, the device 302 may be configured to perform multiple iterations of beam selections, e.g., triggered by one or more predefined conditions. The device 302 may be configured to perform multiple iterations of beam selections such that the selected beams converge on optimal beams for the link 312, as described in greater detail below.

The device 302 may be configured to perform beam selection by performing beamforming to provide a plurality of beams for a link 312 between the HWD 304 and console 306 (e.g. for the uplink or the downlink). The device 302 may be configured to perform beamforming for both the uplink and the downlink (e.g., on both sides of the link 312). The device 302 may be configured to perform beamforming for the link 312 to provide a plurality of beams at both sides of the link 312 (e.g., a plurality of beams projected from the HWD 304 towards the console 306 and a plurality of beams projected from the console 306 towards the HWD 304).

The device 302 may be configured to identify, compute, measure, or otherwise determine a signal-to-interference-plus-noise ratio (SINR) for the plurality of beams. In some embodiments, the device 302 may be configured to determine the SINR for (e.g., in using) each of the plurality of beams (e.g., on both sides of the link 312). In some embodiments, the device 302 may be configured to determine a SINR for a subset of the plurality of beams (e.g., on both sides of the link 312). The device 302 may be configured to determine the SINR by comparing the strength of a target or main signal divided by a sum of the interference power (from all the other interfering signals) and a strength of background noise. The device 302 may be configured to select a beam based on the SINR of the plurality of beams. In some embodiments, the device 302 may be configured to select a beam for the link 312 which corresponds to a maximum of the SINR. In some embodiments, the device 302 may be configured to select beams for both sides of the link 312 (e.g., select a beam for downlink communications from the console 306, select a beam for uplink communications from the HWD 304, and so on).

Once the device 302a selects beams for the first link 312a, the device 302b may be configured to select beams for the second link 312b. While described is the device 302a selecting beams for their respective link 312a, it is noted that, in some implementations, the device 302a may select beams for the second link 312b along with selecting beams for the first link 312a. In such embodiments, the device 302a may act as a master device, whereas other devices 302 located in the environment 300 may act as slave devices 302 (e.g., receiving beam selecting instructions from the master device).

The device 302 may be configured to select beams for the second link 312b in a manner similar to the selection of beams for the first link 312a. Thus, the device 302 may be configured to select beams for the second link 312b by performing beamforming to provide a plurality of beams for the second link 312b (e.g., on both sides of the second link 312b), and select a beam for the second link 312b (or beams for both sides of the link 312b) based on a SINR of the plurality of beams for the second link 312b. The device 302 may be configured to select beams for the second link 312b while the selected beams for the first link 312a are active (and potentially interfering with the second link 312b). The device 302 may thus select beam(s) for the second link 312b which maximize the SINR for the second link 312b, even while the first link 312a may potentially be interfering with the second link 312b.

The device 302 may be configured to perform one or more additional iterations of selection of beams for both the first link 312a and second link 312b. For example, the device 302 may be configured to perform a second distributed beam selection (e.g., a second beam selection for the first link 312a and second link 312b). The device 302 may be configured to perform a beam selection for the first link 312a while the selected beams for the second link 312b (e.g., from the previous iteration) are active (and thereby potentially interfering with the first link 312a). The device 302 may be configured to then perform beam selection for the second link 312b while the (latest) selected beams for the first link 312a are active.

In some instances, responsive to performing two iterations of beam selection, the SINR of both links 312a, 312b may converge to optimize performance (e.g., quality, SINR, SINR) of both links 312a, 312b. Correspondingly, the beam selection may be computationally inexpensive, while still providing strong SINR results. In some instances, the device 302 may perform additional iterations of beam selection to further optimize performance of the links 312a, 312b. While described as two links 312a, 312b, it is noted that distributed beam selection may be performed for any number of links 312 present in the space. For example, the device 302 may be configured to perform beam selection for three or more links 312 corresponding to devices co-located in the environment 300.

Figure 5:
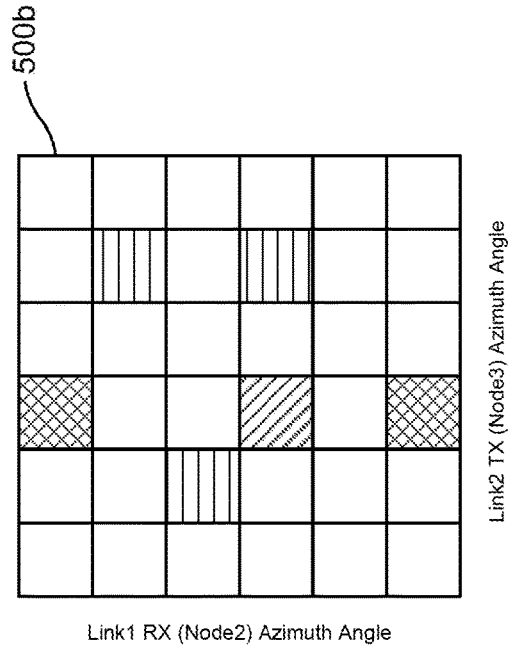
FIG. 5 is an example set of heat maps used to perform beam selection, according to an example implementation of the present disclosure.
Figure 5:
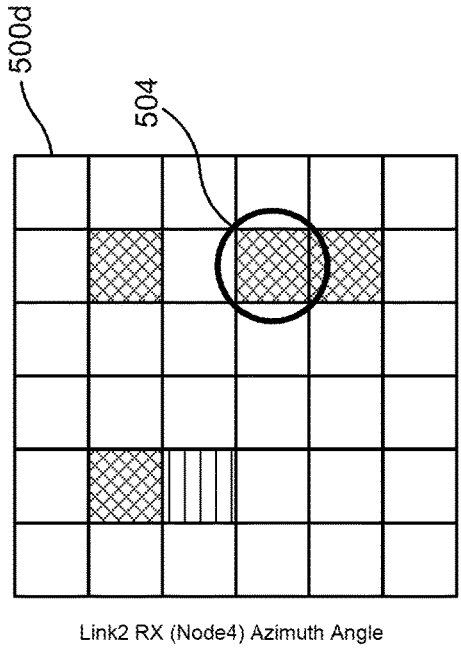
Figure 5:
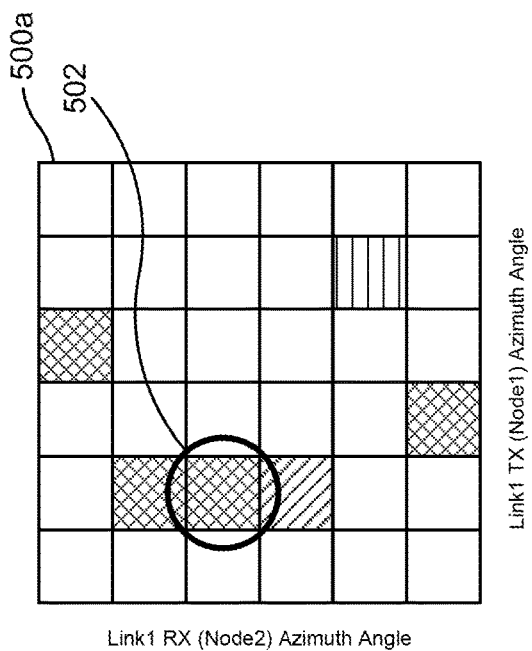
Figure 5:
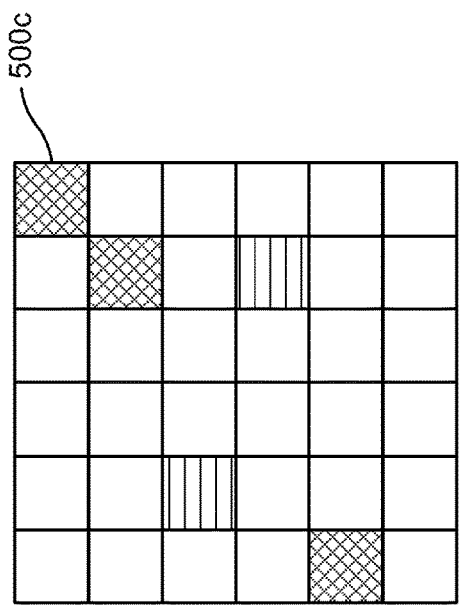

Referring now to FIG. 5, depicted is a series of heat maps 500 corresponding to beam selection performed for the links 312 described above, according to illustrative embodiment. For example, the first heat map 500a may correspond to the first link 312a between the first HWD 304a and the first console 304a, the second heat map 500b may correspond to a connection between the first HWD 304a and second console 304b (e.g., representing interference between the first and second link 312a, 312b), the third heat map 500c may correspond to a connection between the second HWD 304b and first console 304a (e.g., representing interference representing interference between the first and second link 312a, 312b), and the fourth heat map 500d may correspond to the second link 312b between the second HWD 304b and second console 304b.

Each of the blocks shown in the heat maps 500 may correspond to a SINR for beams corresponding to a connection or channel. Specifically, the blocks having a crossed line pattern may correspond to a high SINR (e.g., a SINR greater than 12), the blocks having a diagonal line pattern may correspond to a medium-high SINR (e.g., a SINR between 8 and 12). The blocks having a solid white pattern may correspond to a medium-low SINR (e.g., a SINR between 4 and 8). The blocks having a horizontal line pattern may correspond to a low SINR (e.g., a SINR less than 4). The x- and y-axes for the respective heat maps 600 may correspond to an Azimuth angle for the respective sides of the channel or link (e.g., for the first heat map 500a, the x-axis corresponds to the console 306a for the first link 312a and the y-axis corresponds to the HWD 304a for the first link 312a). The Azimuth angle may define or represent various options of beams from performing beamforming at either end of a connection or channel (e.g., the links 312a, 312b as well as interfering links).

Responsive to performing two (or more) iterations of beam selection as described above, the selected beams may converge to provide optimized beams having a high SINR for the first and second link 312a, 312b (as shown in heat map 500a, 500d), and low SINR for any interfering links (as shown in heat map 500b, 500c). For example, the device 302 may be configured to select beams 502 for the first link 312*a* by selecting an Azimuth angle for beams from the HWD 304*a* and console 306*a* which maximizes a SINR of the first link 312*a*. The device 302 may be configured to select an Azimuth angle for beams 502 for the HWD 304*a* and console 306*a* having a high SINR (e.g., blocks having a cross pattern). Similarly, the device 302 may be configured to select beams 504 for the second link 312*b* by selecting an Azimuth angle for beams from the HWD 304*b* and console 306*b* which maximizes a SINR of the second link 312*b*. When the device 302 performs two (or more iterations) of beam selection for the first and second link 312*a*, 312*b* while the other links 312*b*, 312*a* are active, the selected beams may converge such that the interfering links may have a low SINR and the links 312*a*, 312*b* have a high SINR.

As shown in first and second heat maps 500*a*, 500*b*, the Azimuth angle for the HWD 304*a* corresponding to the selected beam 502 results in a high SINR shown in the first heat map 500*a* and low SINR shown in the second heat map 500*b*. Similarly, as shown in the first and third heat map 500*a*, 500*c*, the Azimuth angle for the console 306*a* corresponding to the selected beam 502 results in a high SINR shown in the first heat map 500*a* and a medium-low interference shown in the third heat map 500. As shown in third and fourth heat map 500*c*, 500*d*, the Azimuth angle for the HWD 304*b* corresponding to the selected beam 504 results in a high SINR shown in the fourth heat map 500*d* and low SINR shown in the third heat map 500*c*. Similarly, as shown in the second and fourth heat map 500*b*, 500*d*, the Azimuth angle for the console 306*b* corresponding to the selected beam 504 results in a high SINR shown in the first heat map 500*d* and a low SINR shown in the second heat map 500*b*. Accordingly, the selected beams 502, 504 converge to provide an instance where the first and second links 312*a*, 312*b* have a high SINR and any interfering links have a low SINR.

Figure 6:
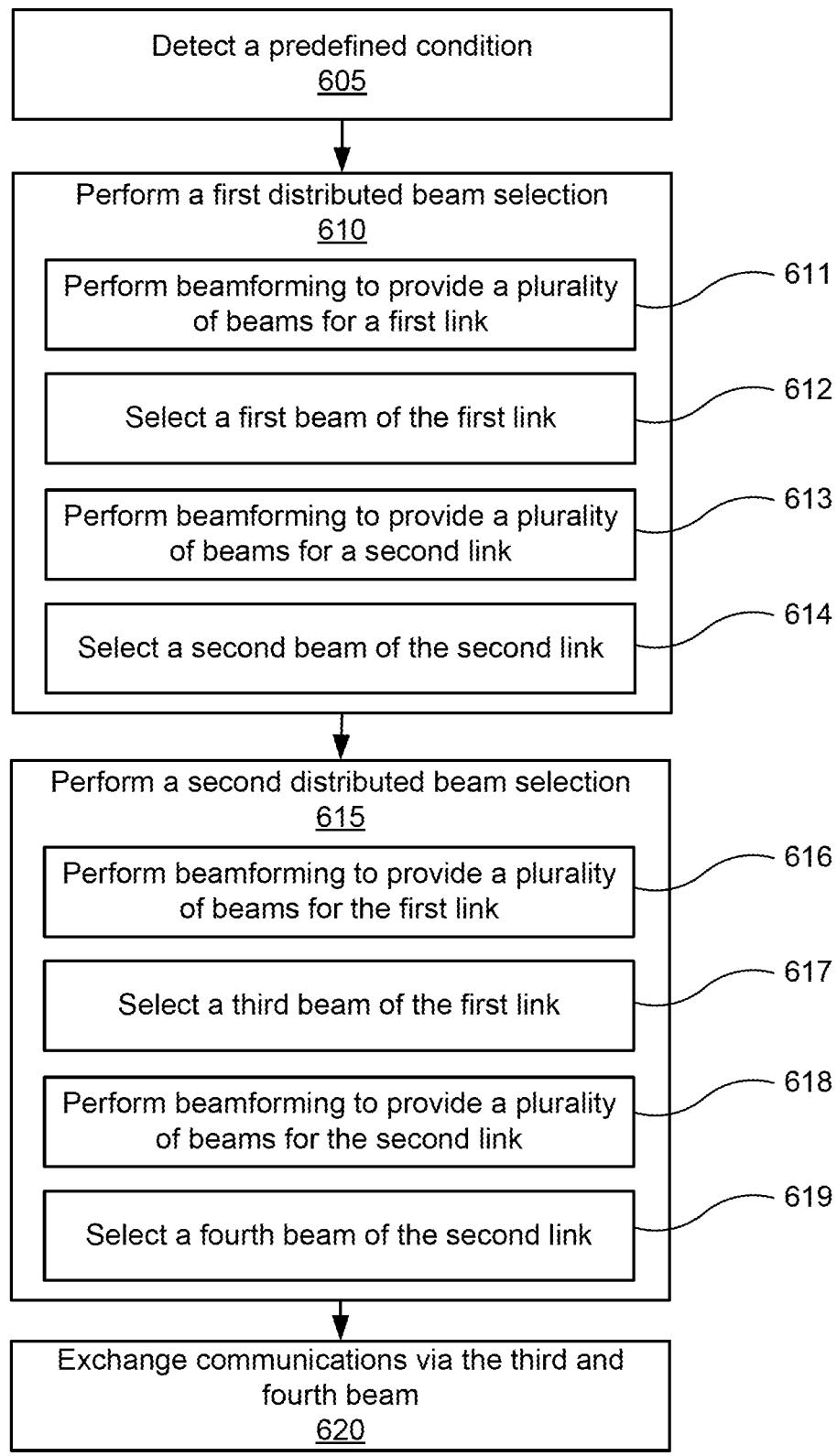
FIG. 6 shows an example process of beam selection, according to an example implementation of the present disclosure.

FIG. 6 shows an example process 600 of iterative distributed beam selection, according to an example implementation of the present disclosure. The process 600 may be performed by the components described above with reference to FIG. 1-FIG. 5 including, for instance, the device 300 which may include any of the HWDs 302 and/or the consoles 304. In some embodiments, the process 600 includes more, fewer, or different steps than shown in FIG. 6. For example, in some embodiments, two or more of the steps may be performed in any combination, and some steps may be performed at substantially the same time. As a brief overview, at step 605, the device 302 detects a predefined condition. At step 610, the device 302 performs a first distributed beam selection. The device 302 may perform the first distributed beam selection by performing beamforming to provide a plurality of beams for a first link 312*a* (step 611). The device 302 may select a first beam for the first link (step 612). The device 302 may perform beamforming to provide a plurality of beams for a second link 312*b* (step 613). The device 302 may select a beam of the second link (step 614). At step 615, the device 302 performs a second distributed beam selection. The device 302 may perform the second distributed beam selection in a manner similar to the first distributed beam selection. At step 620, the device 300 performs communications via the third beam and/or via the fourth beam.

At step 605, and in some embodiments, the device 302 detects a predefined condition. The device 302 may be or include the first HWD 304*a*, the second HWD 304*b*, the first console 306*a*, and/or the second console 306*b*. In some embodiments, the device 302 may be a master (or primary) console 306. In some embodiments, the device 302 may be the console 306*a*, 306*b* (e.g., performing coordination between the respective consoles 306*a*, 306*b*). The device 302 may be configured to detect a predefined condition for triggering beam selection. In some embodiments, the predefined condition may include a drop in a signal-to-interference-plus-noise ratio (SINR) for a first link 312*a* between the first HWD 304*a* and first console 306*a* or a drop in a SINR for the second link 312*b* between the second HWD 304*b* and second console 306*b*. In some embodiments, the predefined condition may be detecting an interfering link. In some embodiments, the predefined condition may be removal of an interfering link. In some embodiments, the predefined condition may be expiration of an amount of time from a previous distributed beam selection.

In some embodiments, the device 302 may detect a predefined condition of a second average SINR being less than a first average SINR. The device 302 may compute, measure, or otherwise determine a SINR for each link 312*a*, 312*b*. The device 302 may maintain a ledger, database, or other dataset including a list or record of SINRs for the links 312*a*, 312*b*. The device 302 may compute or determine an average SINR using data points included in the dataset. In some embodiments, each of the data points in the dataset may include a timestamp corresponding to a time in which the SINR is computed for the link 312*a*, 312*b*. The device 302 may determine a first average SINR corresponding to a first or second link 312*a*, 312*b* for a first time window. The first time window may be configured to determine the first average SINR for the first time window by selecting a subset of data points from the dataset which are included in the time window. The time window may be, for instance, 100 ms, 200 ms, 500 ms, one second, five seconds, 10 seconds, etc., in length In some embodiments, the device 302 may be configured to compute an exponential average SINR for the first time window. Thus, the device 302 may be configured to favor data points having timestamps which are most recent within the time window. The device 302 may then determine a second average SINR corresponding to the first or second link 312*a*, 312*b* for a second time window. The second time window may be more recent relative to the first time window. In some embodiments, the second time window may partially overlap the first time window. The device 302 may be configured to compute the second average SINR in a manner similar to the first average SINR. The device 302 may detect the predefined condition by determining that the second average SINR is less than the first average SINR. In some embodiments, both of the first and second average SINRs are exponential average SINRs. Hence, the device 302 may be configured to compute a first exponential average SINR for the first time window and a second exponential average SINR for the second time window.

In some embodiments, the device 302 may detect a predefined condition including the presence of a link that interferes with at least one of the first link 312*a* or the second link 312*b*. In some embodiments, the device 302 may detect the interfering link by detecting one or more signals from the link while at least one of the first link or the second link is active. Each of the signals exchanged via the links 312 may include identifying information corresponding to a component/destination-device which is to receive the signal. For example, a data packet sent by the first console 306*a* to the first HWD 304*a* may have identifying information corresponding to the first HWD 304*a*. The device 302 may be configured to detect an interfering link based on the identifying information. For example, the console 304*a* may detect an interfering link 312*b* by detecting a packet or signal intended for the console 304b. Similarly, the HWD 304b may detect an interfering link 312a by detecting a packet or signal intended for the HWD 304a. Accordingly, device 302 may detect interfering uplinks or downlinks which interfere with a respective link 312.

The device 302 may maintain a list or ledger of interfering links. In some embodiments, the device 302 may update the list of interfering links to include newly identified or detected interfering links along with a timestamp corresponding to when the interfering link was detected. In some embodiments, the device 302 may update the list to reflect when a particular interfering link was most recently detected by the device 302. Accordingly, the list may include a rolling list of interfering links (e.g., identifying information corresponding to the interfering links) and a timestamp reflecting the most recent time at which the interfering link was detected.

In some embodiments, the device 302 may detect a predefined condition of removal of an interfering link that has previously interfered with at least one of the first link 312a or the second link 312b. In some embodiments, the device 302 may detect removal of the interfering link by detecting that the interfering link has been absent/removed for at least a predetermined amount of time. The device 302 may update the list to remove interfering links which have not been detected (e.g., have been absent) for a predetermined amount of time. Accordingly, the device 302 may apply an aging algorithm to purge, delete, or otherwise remove interfering links from the list which have been absent. The device 302 may remove interfering links based on a difference between a current time to the timestamp included in the list and corresponding to the most recent time in which the interfering link was last detected. The device 302 may remove interfering links responsive to the difference being greater than (or equal to) a predetermined amount of time.

In some embodiments, the device 302 may detect a predefined condition including an expiration of an amount of time from a prior distributed beam selection or a prior beamforming. In other words, the device 302 may automatically perform distributed beam selection where the device 302 has not performed distributed beam selection (for instance) for a predetermined amount of time. The device 302 may maintain a timer which is reset when the device 302 most recently performs distributed beam selection. The device 302 may compare the duration reflected by the timer with a predetermined amount of time. The device 302 may detect a predefined condition responsive to the duration reflected by the timer exceeding the determined amount of time. Accordingly, the device 302 may detect a predefined condition of an expiration of an amount of time from a prior or previous distributed beam selection (or beamforming).

At step 610, and in some embodiments, the device 302 performs a first distributed beam selection. In some embodiments, the device 302 may perform a first distributed beam selection responsive to detecting the predefined condition (e.g., at step 605). The device 302 may perform the first distributed beam selection responsive to detecting one or more of the predefined conditions described above. The device 302 may perform the first distributed beam selection for both links 312a, 312b. In some embodiments, the device 302 may perform the first distributed beam selection for both sides of each link 312a, 312b (e.g., for the uplink of the first link 312a and for the downlink of the first link 312a, an for the uplink of the second link 312b and for the downlink of the second link 312b). The device 302 may perform the first distributed beam selection as described in greater detail below.

In some embodiments, the device 302 may perform the first distributed beam selection by performing beamforming to provide a plurality of beams for a first link 312a (step 611). In some embodiments, the device 302 may perform beamforming to provide a first plurality of beams for a first link 312a between the first HWD 304a and the first console 306a. The device 302 may perform beamforming at both ends of the first link 312a (e.g., for the uplink and the downlink of the first link 312a). Accordingly, the device 302 may perform beamforming at the first HWD 304a to provide a plurality of beams for the first HWD 304a and may perform beamforming at the first console 306a to provide a plurality of beams for the first console 306a.

In some embodiments, the device 302 may perform the first distributed beam selection by selecting a first beam for the first link 312a (step 612). In some embodiments, the device 302 may select a first beam of the first link 312a with a highest signal-to-interference-plus-noise ratio (SINR) from the first plurality of beams. In some embodiments, the device 302 may select a beam for downlink transmission of the first link 312a (e.g., for communications from the console 306a to the HWD 304a) and/or select a beam for uplink transmission of the first link 312a (e.g., for communications from the HWD 304a to the console 306a), for example. The device 302 may compute an SINR for each of the plurality of beams provided at step 611. The device 302 may select beam(s) for the first link which maximizes the SINR for the first link 312a.

In some embodiments, the device 302 may perform the first distributed beam selection by performing beamforming to provide a plurality of beams for a second link 312b (step 613). In some embodiments, the device 302 may perform beamforming to provide a second plurality of beams for a second link 312b between the second HWD 304b and the second console 306b while the first beam of the first link 312a (e.g., selected at step 612) is active. In other words, the device 302 may perform beamforming to provide a second plurality of beams for a second link 312b while communications are sent via the first beam of the first link 312a and therefore potentially interfering with the second link 312b. Similar to performing beamforming for the first link at step 611, the device 302 may perform beamforming at both ends of the second link 312b (e.g., for the uplink and the downlink of the second link 312b). Accordingly, the device 302 may perform beamforming at the second HWD 304b to provide a plurality of beams for the second HWD 304b and may perform beamforming at the second console 306b to provide a plurality of beams for the second console 306b. The device 302 may perform beamforming at both ends of the second link 312b while communications are sent via the first link 312a.

In some embodiments, the device 302 may perform the first distributed beam selection by selecting a beam of the second link (step 614). In some embodiments, the device 302 may select a second beam of the second link 312b with a highest SINR from the second plurality of beams. In some embodiments, the device 302 may select a beam for downlink transmission of the second link 312b (e.g., for communications from the console 306b to the HWD 304b), and/or select a beam for uplink transmission of the second link 312b (e.g., for communications from the HWD 304b to the console 306b), for instance. The device 302 may compute an SINR for each of the plurality of beams provided at step 613. The device 302 may select beam(s) for the second link 312b which maximizes the SINR for the second link 312b while beam selected at step 613 is active and therefore potentially interfering with the second link 312b.

At step 615, and in some embodiments, the device 302 performs a second distributed beam selection. The device 302 may perform the second distributed beam selection in a manner similar to the first distributed beam selection described above with reference to step 610. For example, the device 302 may perform beamforming to provide a third plurality of beams for the first link 312a while the second beam of the second link 312b (selected at step 614) is active (step 616). The device 302 may select a third beam of the first link 312a with a highest SINR from the third plurality of beams (step 617). The device 302 may perform beamforming to provide a fourth plurality of beams for the second link 312b while the third beam of the first link 312a (selected at step 617) is active (step 618). The device 302 may select a fourth beam of the second link 312b with a highest SINR from the fourth plurality of beams.

At step 620, and in some embodiments, the device 300 exchanges communications via the third beam and/or via the fourth beam. In some embodiments, the device 302 may perform communication via the third beam of the first link 312a and/or perform communication via the fourth beam of the second link 312b. In some embodiments, the device 302 may perform uplink (or downlink) communications via the third beam of the first link 312a and/or perform uplink (or downlink) communication via the fourth beam of the second link 312b. Accordingly, the third and fourth beam selected following the second distributed beamforming may converge on a selection of beams which maximizes a SINR for the respective links 312a, 312b while minimizing interference from other links 312b, 312a.

C. Computing System

Figure 7:
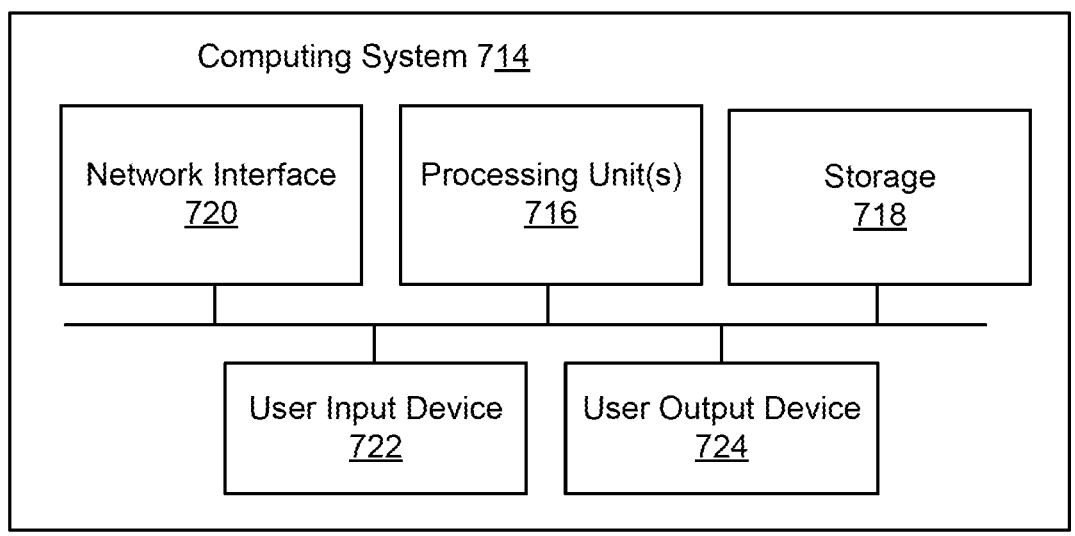
FIG. 7 is a block diagram of a computing environment according to an example implementation of the present disclosure.

Various operations described herein can be implemented on computer systems. FIG. 7 shows a block diagram of a representative computing system 714 usable to implement the present disclosure. In some embodiments, the console 110, the HWD 150 or both of FIG. 1 are implemented by the computing system 714. Computing system 714 can be implemented, for example, as a consumer device such as a smartphone, other mobile phone, tablet computer, wearable computing device (e.g., smart watch, eyeglasses, head mounted display), desktop computer, laptop computer, or implemented with distributed computing devices. The computing system 714 can be implemented to provide VR, AR, or MR experiences. In some embodiments, the computing system 714 can include conventional computer components such as processors 716, storage device 718, network interface 720, user input device 722, and user output device 724.

Network interface 720 can provide a connection to a wide area network (e.g., the Internet) to which WAN interface of a remote server system is also connected. Network interface 720 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 722 can include any device (or devices) via which a user can provide signals to computing system 714; computing system 714 can interpret the signals as indicative of particular user requests or information. User input device 722 can include any or all of a keyboard, touch pad, touch screen, mouse, or other pointing device, scroll wheel, click wheel, dial, button, switch, keypad, microphone, sensors (e.g., a motion sensor, an eye tracking sensor, etc.), and so on.

User output device 724 can include any device via which computing system 714 can provide information to a user. For example, user output device 724 can include a display to display images generated by or delivered to computing system 714. The display can incorporate various image generation technologies, (e.g., a liquid crystal display (LCD)), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 724 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 716 can provide various functionality for computing system 714, including any of the functionality described herein as being performed by a server or client, or other functionality associated with message management services.

It will be appreciated that computing system 714 is illustrative and that variations and modifications are possible. Computer systems used in connection with the present disclosure can have other capabilities not specifically described here. Further, while computing system 714 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations (e.g., by programming a processor or providing appropriate control circuitry) and various blocks might or might not be reconfigurable depending on how the initial configuration is obtained. Implementations of the present disclosure can be realized in a variety of apparatuses including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements, and features discussed in connection with one implementation are not intended to be excluded from a similar role in other implementations or implementations.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate, or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general or special purpose computer or other machine with a processor. By way of example, such machine-readable media can comprise RAM, ROM, EPROM, EEPROM, or other optical disk storage, magnetic disk storage, or other magnetic storage devices, or any other medium which can be used to carry or store desired program code in the form of machine-executable instructions or data structures and which can be accessed by a general or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation," or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially," or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings, and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes, and omissions can also be made in the design, operating conditions, and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method, comprising:
    detecting, by a device comprising at least one of a first head wearable display (HWD), a second HWD, a first console, or a second console, a predefined condition;
    performing, by the device, a first distributed beam selection responsive to detecting the predefined condition, wherein performing the first distributed beam selection comprises:
        performing beamforming to provide a first plurality of beams for a first link between the first HWD and the first console;
        selecting a first beam of the first link with a highest signal-to-interference-plus-noise ratio (SINR) from the first plurality of beams;
        performing beamforming to provide a second plurality of beams for a second link between the second HWD and the second console while the first beam of the first link is active;
        selecting a second beam of the second link with a highest SINR from the second plurality of beam; and
    performing, by the device, a second distributed beam selection, wherein performing the second distributed beam selection comprises:
        performing beamforming to provide a third plurality of beams for the first link while the second beam of the second link is active;
        selecting a third beam of the first link with a highest SINR from the third plurality of beams;
        performing beamforming to provide a fourth plurality of beams for the second link while the third beam of the first link is active; and
        selecting a fourth beam of the second link with a highest SINR from the fourth plurality of beams.

2. The method of claim 1, further comprising:
    performing, by the device, communication via the third beam of the first link or the fourth beam of the second link.

3. The method of claim 1, comprising:
    determining, by the device, for a first time window, a first SINR corresponding to at least one of the first link or the second link;
    determining, by the device, for a second time window, a second average SINR corresponding to the at least one of the first link or the second link; and
    detecting, by the device, the predefined condition, the predefined condition comprising the second average SINR being less than the first average SINR.

4. The method of claim 3, wherein the first average SINR comprises a first exponential average SINR and the second average SINR comprises a second exponential average SINR.

5. The method of claim 1, wherein detecting the predefined condition comprises:
    detecting, by the device, an interfering link that interferes with at least one of the first link or the second link.

6. The method of claim 5, wherein detecting the link comprises:
    detecting, by the device, one or more signals from the interfering link while at least one of the first link or the second link is active.

7. The method of claim 1, wherein detecting the predefined condition comprises:
    detecting, by the device, removal of an interfering link that has previously interfered with at least one of the first link or the second link.

8. The method of claim 7, wherein detecting removal of the interfering link comprises:
    detecting, by the device, that the interfering link has been absent for at least a predetermined amount of time.

9. The method of claim 1, wherein detecting the predefined condition comprises:
    determining, by the device, expiration of an amount of time from a prior beamforming or distributed beam selection.

10. A device comprising at least one of a first head wearable display (HWD), a second HWD, a first console, or a second console, the device having at least one processor configured to:
    detect a predefined condition; and
    perform a first distributed beam selection responsive to detecting the predefined condition, wherein performing the first distributed beam selection comprises:
        performing beamforming to provide a first plurality of beams for a first link between the HWD and the console;
        selecting a first beam of the first link with a highest signal-to-interference-plus-noise ratio (SINK) from the first plurality of beams;
        performing beamforming to provide a second plurality of beams for a second link between the HWD and the console while the first beam of the first link is active; and
        selecting a second beam of the second link with a highest SINR from the second plurality of beams; and
    perform a second distributed beam selection, wherein performing the second distributed beam selection comprises:
        performing beamforming to provide a third plurality of beams for the first link while the second beam of the second link is active;
        selecting a third beam of the first link with a highest SINR from the third plurality of beams;

performing beamforming to provide a fourth plurality of beams for the second link while the third beam of the first link is active; and selecting a fourth beam of the second link with a highest SINR from the fourth plurality of beams.

11. The system of claim 10, wherein the at least one processor is further configured to perform downlink communication via the third beam of the first link or the fourth beam of the second link.

12. The system of claim 10, wherein the at least one processor is further configured to:
determine, for a first time window, a first average SINR corresponding to at least one of the first link or the second link;
determine, for a second time window, a second average SINR corresponding to the at least one of the first link or the second link; and
detect the predefined condition, the predefined condition comprising the second average SINR being less than the first average SINR.

13. The system of claim 10, wherein the at least one processor is configured to detect the predefined condition by:
detecting an interfering link that interferes with at least one of the first link and the second link.

14. The system of claim 10, wherein the at least one processor is configured to detect the predefined condition by:
detecting removal of an interfering link that has previously interfered with at least one of the first link or the second link.

15. The system of claim 14, wherein the at least one processor is configured to detect removal of the interfering link by:
detecting that the interfering link has been absent for at least a predetermined amount of time.

16. The system of claim 10, wherein the at least one processor is configured to detect the predefined condition by:
detecting expiration of an amount of time from a prior beamforming or distributed beam selection.

17. A non-transitory computer readable medium storing program instructions for causing one or more processors to:
detect, in a device comprising at least one of a first head wearable display (HWD), a second HWD, a first console, or a second console, a predefined condition;
perform a first distributed beam selection responsive to detecting the predefined condition, wherein performing the first distributed beam selection comprises:
performing beamforming to provide a first plurality of beams for a first link between the HWD and the console;
selecting a first beam of the first link with a highest signal-to-interference-plus-noise ratio (SINR) from the first plurality of beams;
performing beamforming to provide a second plurality of beams for a second link between the HWD and the console while the first beam of the first link is active; and
selecting a second beam of the second link with a highest SINR from the second plurality of beams; and
perform a second distributed beam selection, wherein performing the second distributed beam selection comprises:
performing beamforming to provide a third plurality of beams for the first link while the second beam of the second link is active;
selecting a third beam of the first link with a highest SINR from the third plurality of beams;
performing beamforming to provide a fourth plurality of beams for the second link while the third beam of the first link is active; and
selecting a fourth beam of the second link with a highest SINR from the fourth plurality of beams.

18. The non-transitory computer readable medium of claim 17, wherein the instructions further cause the one or more processors to perform downlink communication via the third beam of the first link or the fourth beam of the second link.

* * * * *